United States Patent [19]
Dentinger et al.

[11] Patent Number: 6,154,170
[45] Date of Patent: Nov. 28, 2000

[54] ENHANCED ATTITUDE DETERMINATION SYSTEM USING SATELLITE NAVIGATION RECEIVER WITH ANTENNA MULTIPLEXING

[75] Inventors: Michael Paul Dentinger, Los Altos; Yiming Jim Yu, Cupertino, both of Calif.

[73] Assignee: Trimble Navigation Limited, Sunnyvale, Calif.

[21] Appl. No.: 09/146,388

[22] Filed: Sep. 2, 1998

[51] Int. Cl.[7] ........................................................ G01S 5/02
[52] U.S. Cl. .............................................................. 342/357
[58] Field of Search ............................ 342/357.11, 357.06

[56] References Cited

U.S. PATENT DOCUMENTS 5,185,610  2/1993  Ward et al. ........................ 342/357.11

*Primary Examiner*—Thomas H. Tarcza
*Assistant Examiner*—Fred Mull
*Attorney, Agent, or Firm*—Boris G. Tankhilevich

[57] ABSTRACT

The position, velocity, time (PVT) and attitude (ATT) measurement system including a Master GPS antenna and a plurality of Slave GPS antennas is disclosed. The system comprises a hardware PVT channel and a hardware ATT channel. After the Master GPS antenna is selected, the hardware PVT channel stays locked on the Master antenna during the measurement time thus optimizing the accuracy of the PVT data. The PVT channel performs the tracking of the visible GPS satellites and generates the tracking data and the PVT data. The ATT channel performs the attitude measurement using all Slave antennas and the PVT tracking data.

14 Claims, 3 Drawing Sheets

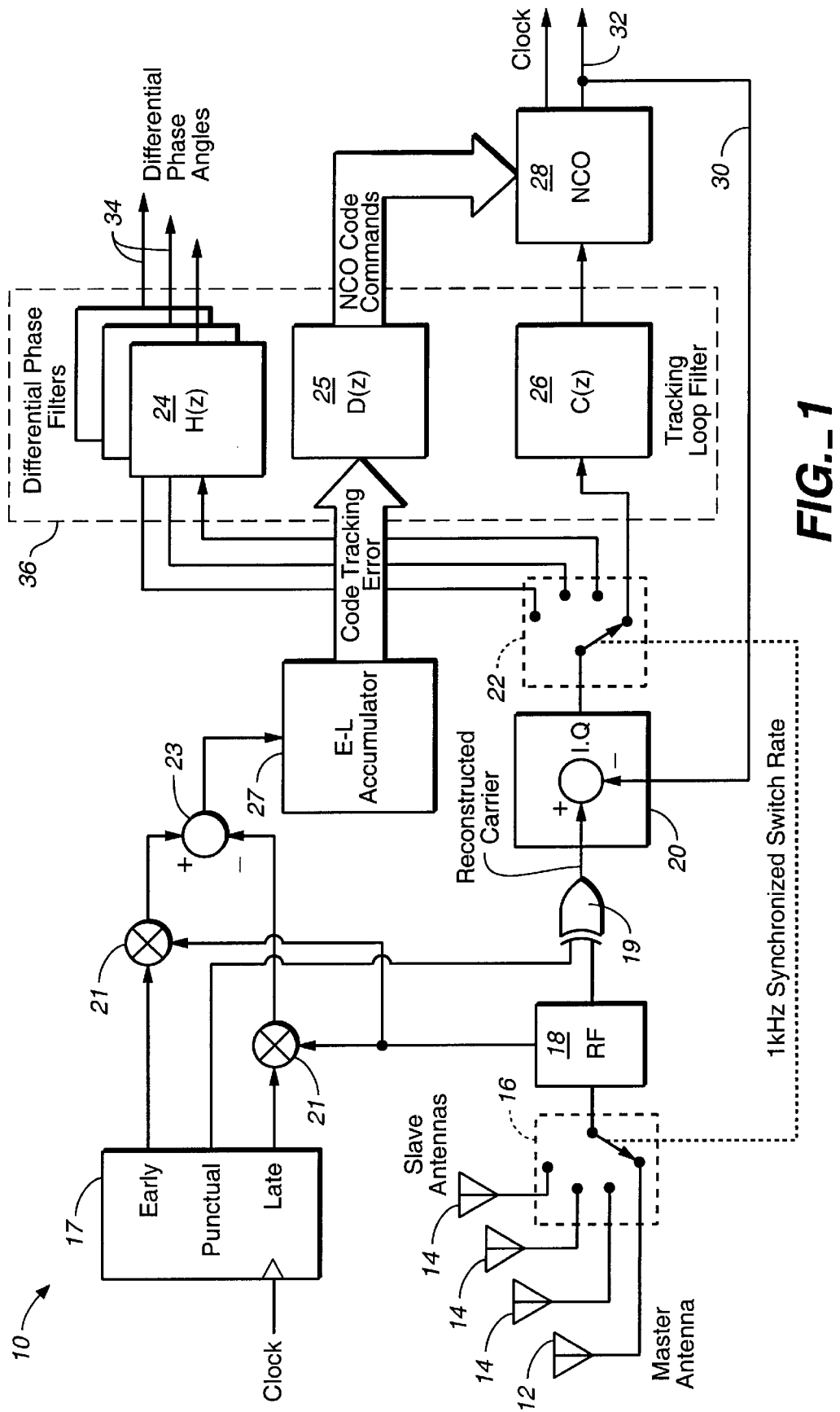
FIG._1

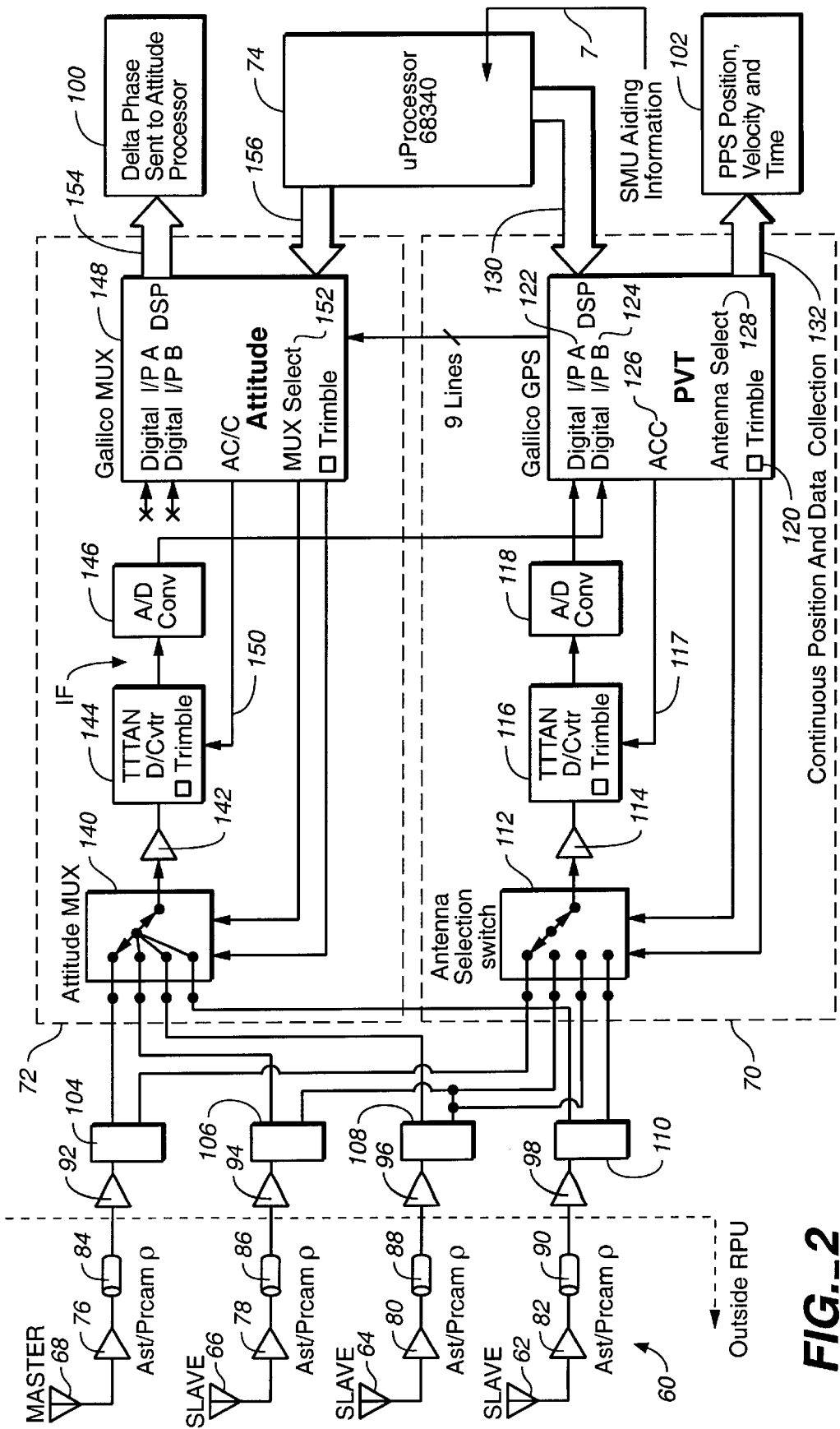
FIG._2

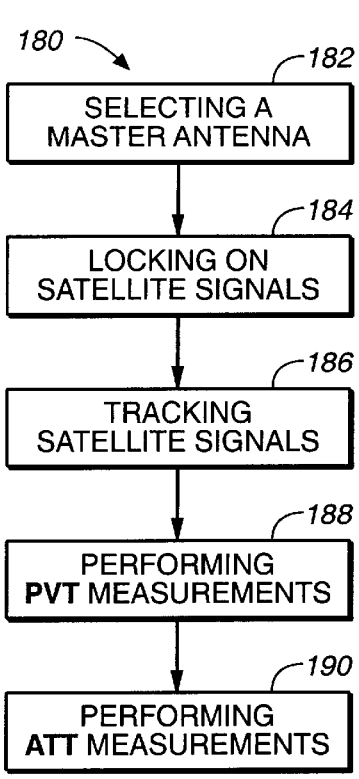
FIG._3
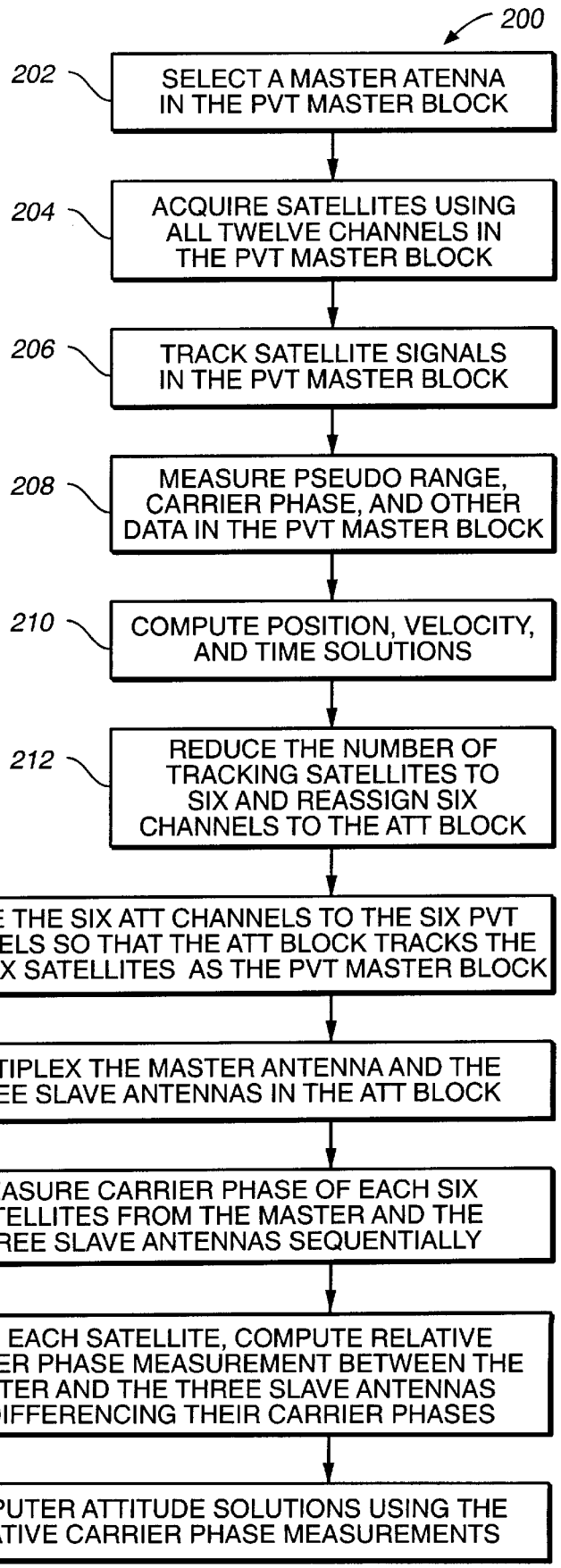
FIG._4

ENHANCED ATTITUDE DETERMINATION SYSTEM USING SATELLITE NAVIGATION RECEIVER WITH ANTENNA MULTIPLEXING

BACKGROUND

In the U.S. Pat. No. 5,268,695 issued to Dentinger et al., a system for time multiplexing a carrier signal received by two or more GPS antennas through a single hardware path was disclosed. This patent is incorporated in the current patent application by reference in its entirety.

In the best mode of the system of '695 patent four GPS antennas were utilized, one Master antenna and three Slave antennas. The code and carrier measurements were performed by using the Master antenna in order to compute the position, velocity and time coordinates (PVT) of the system. On the other hand, the carrier phase measurements were performed by using three Slave antennas in order to compute the attitude (ATT) of the system. All four antennas were time multiplexed in order for a received carrier signal to enter a single hardware path. Thus, the PVT measurements were performed in the system of '695 patent using the Master antenna only 25% of the overall time spent on all measurements. This caused a reduction in the available carrier-to-noise ratio ($C/N_0$) in the system of '695 patent as compared to a system where a Master antenna uses all 100% of its time on PVT measurements.

The ability to track signals with lower ($C/N_0$) values results in enhanced system performance in low ($C/N_0$) situations such as high dynamics, jamming environments, and low elevation satellites.

What is needed is a system of differential phase measurement employing a plurality of GPS antennas with enhanced antenna multiplexing for attitude determination that has extended carrier-to-noise ratio ($C/N_0$) performance and is adequate for high dynamics and low signal availability applications.

SUMMARY

The present invention is novel and unique because it discloses a system of differential phase measurement employing a plurality of satellite antennas with enhanced antenna multiplexing that has sufficiently high carrier-to-noise ratio ($C/N_0$) and is adequate for high dynamics applications.

One aspect of the present invention is directed to a measurement system with enhanced antenna multiplexing.

In one embodiment, the measurement system of the present invention with enhanced antenna multiplexing comprises: (a) a plurality of Satellite Positioning System (SATPS) antenna modules configured to process each received satellite signal; (b) at least two hardware modules configured to process each received satellite signal and configured to generate a preliminary data; and (c) a navigational processor. The navigational processor is configured to process the preliminary data and configured to output a PVT data, and an ATT data for an object equipped with the measurement system of the present invention.

The plurality of SATPS antenna modules can comprise at least two Global Positioning System (GPS) antenna modules, at least three Global Orbiting Navigational System (GLONASS) antenna modules, at least three combined GPS/GLONASS antenna modules, or any other plurality of suitable satellite navigation antenna modules.

The first hardware module further comprises a PVT hardware module. The second hardware module further comprises an ATT hardware module.

In one embodiment of the present invention, the PVT hardware module comprises a Master hardware module, the ATT hardware module comprises a Slave module, and the navigational processor comprises a PVT microprocessor and an ATT microprocessor. The PVT microprocessor is configured to compute the PVT data for the measurement system, and the ATT microprocessor utilizes the PVT data to compute the ATT data for the measurement system.

In one embodiment, wherein the plurality of SATPS antenna modules comprises at least three single GPS frequency antenna modules, the PVT Master hardware module further comprises a single GPS frequency PVT Master hardware module.

In one embodiment, the single GPS frequency PVT Master hardware module further comprises: (a) a PVT multiplexer connected to a Master GPS antenna; (b) a PVT radio frequency (RF) downconverter configured to convert each received single frequency GPS satellite signal from the single GPS frequency down to an intermediate frequency IF; (c) a PVT A/D converter configured to convert each IF satellite signal into a digital IF satellite signal; and (d) a PVT digital signal processor (DSP).

The PVT digital signal processor (DSP) further comprises a plurality of K sub-DSP/PVT.

In one embodiment, the integer number K is equal to a number of GPS satellites that can be simultaneously and continuously tracked by the PVT Master hardware module.

In another embodiment, the integer number K is equal to a number of GPS satellites that can be sequentially and continuously tracked by the PVT Master hardware module.

Each sub-DSP/PVT is configured to sample each input GPS L1 satellite signal, and to continuously perform code phase adjustments in a PVT code tracking loop as well as to continuously perform carrier phase adjustments in a PVT carrier tracking loop in order to compensate for the continuous Doppler shift of each received satellite signal.

In one embodiment, the ATT Slave hardware module further comprises a single GPS frequency ATT Slave hardware module further comprising: (a) an attitude (ATT) multiplexer continuously switching between four GPS antennas; (b) an ATT radio frequency (RF) downconverter configured to convert each received single GPS frequency satellite signal from the single GPS frequency down to the intermediate frequency IF; (c) an attitude (ATT) A/D converter configured to convert each IF satellite signal into a digital IF satellite signal; and (d) an attitude (ATT) digital signal processor (DSP).

The attitude (ATT) digital signal processor (DSP) comprises a plurality of N sub-DSP/ATT, wherein the integer number N is equal to a number of GPS satellites that can be simultaneously (or sequentially) and continuously tracked by the PVT Master hardware module.

Another aspect of the present invention is directed to a method of attitude determination comprising the steps of: (a) selecting a master antenna; (b) locking on a satellite signal utilizing the master antenna; (c) tracking the received satellite signal by continuously adjusting a carrier numerically controlled oscillator (NCO) and a code numerically controlled oscillator (NCO) thus continuously closing code and carrier tracking loops in the PVT DSP module; (d) performing PVT measurements utilizing the PVT channel; and (e) performing attitude measurements utilizing the PVT channel and the ATT channel.

BRIEF DESCRIPTION OF THE DRAWINGS

FIG. 1 depicts a prior art system for the differential phase measurement through antenna multiplexing.

FIG. 2 shows a present invention system of differential time measurement with enhanced antenna multiplexing.

FIG. 3 illustrates a flow chart of the basic steps of a method of attitude determination using the system of FIG. 2.

FIG. 4 depicts a flow chart of the detailed steps of a method of attitude determination using the system of FIG. 2.

FULL DESCRIPTION OF THE PREFERRED EMBODIMENTS

The GPS is a system of satellite signal transmitters, with receivers located on the Earth's surface or adjacent to the Earth's surface, that transmits information from which an observer's present location and/or the time of observation can be determined. There is also the Global Orbiting Navigational System (GLONASS), which can operate as an alternative GPS system.

The GPS is part of a satellite-based navigation system developed by the United States Department of Defense (DOD) under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiplies f1=154 f0 and f2=120 f0 of a base frequency f0=10.23 MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers carried by ground observers. Some of the PRN codes are unknown.

A first known PRN code for each GPS satellite, sometimes referred to as a precision code or P-code, is a relatively long, fine-grained code having an associated clock or chip rate of f0=10.23 MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes a complete information about the transmitting satellite within next several hours of transmission) and an almanac for all GPS satellites (which includes a less detailed information about all other satellites). The satellite information transmitted by the transmitting GPS has the parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System,* Tom Logsdon, Van Nostrand Reinhold, New York, 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9k/16)$ GHz and $f2=(1.246+7k/16)$ GHz, where k $(=1,2,\ldots 24)$ is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range (Ri) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver actually estimates not the true range $R_i$ to the satellite but only the pseudo-range ($r_i$) to each SATPS satellite.

After the SATPS receiver determines the coordinates of the i-th SATPS satellite by picking up transmitted ephemeris constants, the SATPS receiver can obtain the solution of the set of the four equations for its unknown coordinates (x0, y0,z0) and for unknown time bias error (cb). The SATPS receiver can also obtain its heading and speed. (See *The Navstar Global Positioning System*, Tom Logsdon, Van Nostrand Reinhold, 1992, pp. 8–33, 44–75, 128–187.) The following discussion is focused on the GPS receiver, though the same approach can be used for any other SATPS receiver.

The C/A code modulated phase quadrature carrier component of the L1 signal is provided for commercial use. If certain applications, it is sufficient to use only the L1 signal carrier.

FIG. 1 depicts a prior art GPS carrier phase measurement system (10) disclosed in the above referenced '695 patent, that comprises a Master antenna (12), a plurality of Slave antennas (14), and an input multiplexer switch (16).

Any GPS antenna in the group of antennas (12 or 14) shown in FIG. 1 may be designated as Master antenna (12). The label "Master" is arbitrary. However, the one antenna chosen to be a Master one should preferably have the strongest signal reception with the least amount of multipath interference.

Each time multiplexer (16) connects Master antenna (12) through to RF amplifier (18), an error signal is produced by correlator (20) that is output to tracking loop filter (26) via output multiplexer (22). A resulting frequency and phase correlation is communicated to numerically controlled oscillator (NCO) (28) from tracking loop filter (26). Part of the output of NCO (28) is returned to correlator (20) by feedback signal (30).

The principles of the GPS signal tracking and acquisition are described in the article authored by J. J. Spilker and entitled "GPS Signal Structure and Performance Characteristics", pp 47–53, published in Global Positioning System, Vol. I, by The Institute of Navigation, 1980, Alexandria, Va. This article is incorporated herein by reference.

The GPS receiver can track the received GPS signals having very low signal levels by using a Delay-Lock Loop. The essential element of the Delay-Lock Loop is the module code correlator. The received code is multiplied by a reference code having a time offset $\tau < T$; T being a code chip interval. The code correlation is performed at 3 time points (E-early, P-punctual and L-late) on the autocorrelation function graph.

In the prior art system (10 of FIG. 1), the E, P, and L samples of the autocorrelation function are integrated in the correlator module (20). However, the correlator's module (20) output itself is not sufficient for code tracking because it does not provide an indication of the sign of the delay error of a tracking reference signal. Therefore, in the Delay-Lock Loop the outputs of the E and L correlation are subtracted to form a correlation signal. This correlation signal becomes a number signal which is used to drive the NCO module (28).

Thus NCO module (28) among other things includes a clock function that is used to drive the code generator (17) in such a manner that if the clock is lagging in phase, the correction signal drives the clock faster and the reference code speeds up and runs in coincidence with the received signal. Thus, the reference code is tracking the received code. The epoch time ticks are then a measure of the received signal time. The GPS receiver also has a coincident or punctual (P) channel.

If the received signal delay increases suddenly because of user platform motion the delay error increases momentarily and the correction signal increases from zero. The reference code then slows down and increases its delay until it matches the received signal at which point the correction signal decreases to zero again. Thus, given an initial small error and sufficiently slow dynamics of delay change relative to the filter bandwidth, the Delay-Lock-Loop will track the incoming signal. Once the code tracking has been accomplished by the Delay-Lock-Loop, the BPSK satellite signal data at 50 bps can be recovered by the punctual channel (P).

The satellite signal acquisition should be accomplished before the signal tracking is accomplished. The tracking performance discussion of the GPS signals has assumed that somehow the reference code tracking error has been decreased to less than +1 code chip error. Initially the GPS receiver may have little knowledge of its exact position and there may be a significant uncertainty as to the relative Doppler effect. With the C/A code there are a limited number, 1023, of code chips in the period; hence even with no initial knowledge of position relative to the satellite, one need only search a maximum of 1023 code chips.

Eventually, the closed feedback causes NCO (28) to lock-on to the GPS carrier frequency and phase as seen by Master antenna (12). Differences in phase coming from Slave antenna (14) can be then interpreted as being the result of the Slave antenna (14) being closer to or farther away from the particular GPS satellite sending the received carrier signal. Periodically, when input multiplexer (16) selects a Slave antenna (14) the output multiplexer (22) sends the output of correlator (20) to a differential phase filter (24). The path between input multiplexer (16) and output multiplexer (22) is thus shared and a need for phase delay matching is eliminated.

A respective differential phase angle output (34) represents the differential phase angle of the GPS carrier as seen by the respective Slave antennas (14) and by the Master antenna. Therefore, the angle between the GPS radio carrier line of propagation and a baseline drawn between Master antenna (12) and the Slave antenna (14) can be calculated. As a result, the attitude of the object that is equipped with the measurement device (10) of FIG. 1 can be also computed. For instance, the heading of the object can be determined because it is parallel to the baseline between the Master and Slave antennas. If this is not the case, offsets are used to correct misalignment.

However, in the best mode of the system of '695 patent, the code and carrier measurements were performed by using the Master antenna (12) in order to compute the position, velocity and time coordinates (PVT) of the system. On the other hand, the carrier phase measurements were performed by using three Slave antennas (14) in order to compute the attitude (ATT) of the system. All four antennas were time multiplexed in order for a received carrier signal to enter a single hardware path. Thus, the PVT measurements were performed in the system of '695 patent using the Master antenna (12) only 25% of the overall time spent on all measurements. This results in the loss of the carrier-to-noise ratio ($C/N_0$), as was stated above.

FIG. 2 depicts a system of differential time measurement (60) that is designed to compensate for the lost ($C/N_0$). The system (60) of FIG. 2 is the subject of the present invention.

The measurement system (60) employs four SATPS antenna modules. In one embodiment, the measurement system (60) employs at least two combined GPS/Global Orbiting Navigational System (GLONASS). In another embodiment, the measurement system (60) employs at least three Global Orbiting Navigational System (GLONASS).

In one embodiment, the measurement system (60) employs an external inertial measurement unit (IMU) that generates an aiding signal (75 of FIG. 2). The aiding signal (75) can be used by the system (60) when the number of visible navigational satellites is insufficient for the navigational purposes.

In the preferred embodiment, the measurement system (60) employs four GPS antennas (62, 64, 66, 68). The measurement system (60) further comprises two hardware modules (70) and (72). Both hardware module (70 and 72) are connected to each GPS antenna (62, 64, 66, 68).

In one embodiment, one of these four antennas, antenna (68), is selected to be a Master antenna during the 100% time of measurement. In this embodiment, the hardware module (70) comprises a position, velocity and time (PVT) Master hardware module, and the hardware module (72) comprises an attitude (ATT) Slave hardware module.

Each Master and Slave GPS antenna module (68, 66, 64, and 62) can be implemented using a single frequency Trimble antenna module that is used in a single L1 frequency TANS VECTOR TRIMBLE GPS receiver. The FORCE 25 TRIMBLE Receiver can be used in dual frequency applications to receive both L1 and L2 GPS signals.

The use of multiple signals (L1–Ln) from GPS constellation and the use of signals from GLONASS could be implemented independently or in parallel with the usage of L1 GPS signal. Measurements can be done continuously or sequentially. The use of multiple measurements results in greater anti jamming, anti-spoofing, integrity monitoring and enhanced accuracy capabilities of both PVT (70) and Attitude (72) subsystems of system (60) of FIG. 2.

As it is described below in the preferred embodiment of the present invention, both PVT and Attitude measurements are performed using the GPS L1 signal. However, both PVT and Attitude measurements can be additionally performed using any other available signals from the GPS or GLONASS system. To incorporate the usage of these additional signals, suitable adjustments should be made to the receiving antenna subsystem processing hardware and software. These changes are required to properly acquire, track, extract data from, make measurements from, and calculate PVT and Attitude solutions using the new signals(s) of interest. Specifically, the usage of the L2 frequency for the GPS which would require additional hardware to receive the signal and adjustments to characteristics as compared to the usage of only L1 GPS signal. The same approach could be extended to any additional signal (Ln) intended for radio navigation use.

The GLONASS system carrier frequencies are frequency division multiplexed (different transmission frequencies), as described in the background material. To adapt the invention for usage with GLONASS system, additional hardware and software are required. The GLONASS compatible hardware should be tuned to the GLONASS signal characteristics. The GLONASS compatible software should be able to adjust for carrier frequency differences when measuring phase angles for use in attitude processing.

Referring back to FIG. 2, the measurement system (60) further comprises a preliminary processor (74) connected to hardware module (70) and to hardware module (72) that is configured to process the preliminary data generated by each hardware module.

The processor (74) can be implemented using a Motorola uProcessor chip 68030.

The measurement system (60) further comprises a PVT microprocessor (102) connected to the PVT Master hardware module that is configured to generate and output PVT data. The measurement system (60) also comprises an ATT microprocessor (104) connected to the PVT microprocessor that utilizes the PVT data to compute the ATT data.

Each GPS antenna module (68, 66, 64, and 62) further comprises respectively a preamplifier module (76, 78, 80, and 82) that should be placed as close as possible to the remote antenna element so that the RF attenuation, which degrades system sensitivity, is minimized.

In one embodiment, the preamplifier requirements are such that the L1 signals should be amplified by approximately 30 dB (including cable loss) and that the system noise figure should be set as less than 3.5 dB (the lower the better), assuming a 0 dBic gain antenna.

The GPS signal is delivered from the preamplifier module (76, 78, 80, and 82) to the analog circuitry via coaxial cables (84, 86, 88, and 90). The signal is bandpass filtered (92, 94, 96, and 98) and sent to an amplifier (104, 106, 108, and 110) to raise the signal level and set the second stage system noise figure.

The measurement system (60) further comprises the PVT hardware module (70) and the ATT hardware module (72). Both hardware module (70 and 72) are connected to each GPS antenna (62, 64, 66, 68).

In one embodiment, the PVT Master hardware module (70) further comprises a GPS L1 PVT Master hardware module.

The GPS L1 PVT Master hardware module (70) further includes a PVT multiplexer (112).

In one embodiment, PVT multiplexer (112) is used to select the Master GPS antenna (68) from the four GPS antennas (68, 66, 64, and 62) during the time of measurements. In another embodiment, PVT multiplexer (112) can be used to select another Master GPS antenna from the four GPS antennas (68, 66, 64, and 62) during the time of measurements under the control signal (128) from the digital signal processor module (120). (See discussion below).

However, once selected, the Master antenna stays connected to the Master PVT hardware module (70) during the 100% time of measurements.

The GPS L1 PVT Master hardware module (70) further includes a PVT radio frequency (RF) downconverter (116) configured to convert each received L1 GPS satellite signal from the L1 frequency down to a second intermediate frequency IF (10–15) MHz.

In one embodiment, the PVT radio frequency (RF) downconverter (116) module can be implemented using a silicon monolithic dual-downconverter ASIC Trimble "TITAN".

In another embodiment, the PVT radio frequency (RF) downconverter (116) module can be implemented using discrete components.

The input stage of the TITAN amplifies the GPS signal and then downconverts the signal to the second intermediate frequency (IF) (10–15) MHz. The PVT A/D converter (118) connected to the PVT RF downconverter (116) is configured to convert each IF satellite signal into a digital IF satellite signal. The TITAN has an input for AGC (117) necessary for optimal system performance when using a two-bit A/D converter (118).

Finally, a PVT digital signal processor (DSP) (120) is connected to the PVT A/D converter (118). The PVT digital signal processor (DSP) (120) can be implemented using a Trimble Galileo GPS chip.

The PVT digital signal processor (DSP) (120) further comprises a plurality of K sub-DSP/PVT (not shown), wherein the integer number K is equal to a number of GPS satellites that can be simultaneously (or sequentially) and continuously tracked by the PVT Master hardware module (70).

Each sub-DSP/PVT module is configured to sample each input GPS L1 satellite signal, to continuously perform code phase adjustments in a PVT code tracking loop (not shown) and to continuously perform carrier phase adjustments in a PVT carrier tracking loop (not shown).

Both the code phase and the frequency adjustments are being continuously performed in order to compensate for the continuous Doppler shift of each received satellite signal due to the relative movement of the satellite (source of the satellite signals) and the object (recipient of the satellite signals) that is equipped with the measurement system (60).

In the preferred embodiment, the system (60) has 12-channel configuration, the first 6 channels are the PVT channels dedicated to the Master antenna at any time. Thus, the PVT solution has a high dynamic capability and the ability to track low signals. The next 6 channels (called attitude channels) multiplex the Master antenna an the three Slave Antennas to produce differential phase measurement.

In one embodiment, acquisition is gained by using all 12 channels. After code and carrier tracking loops are closed and the PVT data is obtained, the 12 channels are reconfigured between PVT and ATT channels.

Thus, in the preferred embodiment, the PVT digital signal processor (DSP) (120) comprises six sub-DSP/PVT modules (not shown) to simultaneously (or sequentially) track at least six GPS satellites. Each sub-DSP/PVT comprises at least two correlators (not shown), one code and one carrier, configured to implement a code tracking loop and a carrier tracking loop for a single satellite channel. (See discussion above about implementation of a code tracking loop and a carrier tracking loop in a GPS satellite receiver).

The PVT digital signal processor (DSP) (120) comprises additionally at least three correlators (not shown) configured to assist in first satellite signal acquisition and configured to assist in channel management.

The PVT digital signal processor (DSP) (120) also comprises a Digital input A channel (122) for PVT data input, a Digital input B channel (124) for ATT data input, and an automatic gain controller (AGC) module (126). The AGC module (126) is used to automatically adjust gain in the Downconverter module (116).

The PVT computer (74) outputs the PVT data.

In one embodiment, the ATT Slave hardware module (72) comprises a GPS L1 ATT Slave hardware module. In this embodiment, GPS L1 ATT Slave hardware module (72) includes an attitude (ATT) multiplexer (140) that is continuously switching between each four GPS antennas (68, 66, 64, and 62). Thus, the ATT Slave hardware module (72) stays connected to each GPS antenna equal amount of time.

The ATT Slave hardware module (72) further comprises an ATT radio frequency (RF) downconverter (144) configured to convert each received GPS L1 satellite signal from the L1 frequency down to the intermediate frequency IF (10–15) MHz.

The ATT radio frequency (RF) downconverter (144) module also can be implemented using a Trimble chip "TITAN".

The ATT RF downconverter (144) is connected to an ATT A/D converter (146) that is configured to convert each IF satellite signal into a digital IF satellite signal.

The ATT A/D converter (146) is connected to an ATT digital signal processor (DSP) (148) that is implemented also using a Trimble Galileo GPS chip.

The ATT digital signal processor (DSP) (148) further comprises a plurality of N sub-DSP/ATT (not shown), wherein the integer number N is equal to a number of GPS satellites that can be simultaneously/sequentially and continuously tracked by the PVT Master hardware module (70). Each sub-DSP/ATT module is connected to one sub-DSP/PVT module (not shown) in order to receive the code phase and frequency adjustment data.

In the preferred embodiment, the system (60) has six PVT channels and six ATT channels. Thus, the ATT digital signal processor (DSP) (148) comprises also six sub-DSP/ATT modules (not shown). Each sub-DSP/ATT further comprises at least two correlators (not shown) configured to implement at least one satellite channel. The ATT digital signal processor (DSP) (148) further comprises at least three additional correlators (not shown) configured to assist in first satellite signal acquisition and configured to assist in channel management. The ATT Downconverter module (144) utilizes the automatic gain controller (AGC) module (126) from the PVT hardware channel (70) to automatically adjust its gain.

As was mentioned above, the PVT hardware channel (70) performs tracking of all visible GPS satellites and transmits the adjustment data to the ATT channel. Thus, though the ATT hardware channel (72) is relieved from code and carrier tracking functions, it maintains the same high ($C/N_0$) and high dynamic capability as the PVT channel. The ATT channel is focused on only carrier phase measurements and for these purposes all four GPS antennas (68, 66, 64, and 62) are equal, so there is no need for tracking.

The ATT computer (100) outputs all three differential phase angles of the GPS carrier signal emanating from a single visible satellite-vehicle as seen by respective Slave antennas (66, 64, or 62) and by the Master antenna (68). Therefore, the angles between the GPS radio carrier line of propagation and three baselines drawn between Master antenna (68) and each of the Slave antennas (66, 64, or 62) can be calculated. Thus, the attitude (that is all three angles, roll, pitch, and heading) of the object that is equipped with the measurement device (60) of FIG. 2 can be computed.

FIG. 3 depicts a flow chart (180) of the basic steps of a method of attitude determination using the system (60 of FIG. 2).

After selecting a Master antenna (step 182) and locking on a satellite signal (step 184) utilizing the Master antenna, the system (60 of FIG. 2) performs the tracking of the received satellite signal (step 186) by continuously adjusting carrier numerically controlled oscillator (NCO) and code numerically controlled oscillator (NCO) and thus continuously closing code and carrier tracking loops in the PVT DSP module (120 of FIG. 2).

After the tracking is accomplished, the PVT measurements are performed (step 188) utilizing the PVT channel (70 of FIG. 2), and the ATT measurement are performed (step 190) utilizing both the PVT channel (70) and the ATT channel (72) of FIG. 2.

The step of tracking further comprises the step (not shown) of continuously adjusting carrier NCO and code NCO in the ATT DSP module by continuously receiving transmitting code and carrier phase adjustments from the PVT DSP module.

The step of performing attitude measurements utilizing both the PVT channel and the ATT channel further comprises the steps of (not shown) continuous time multiplexing satellite signals having independent phase relationships and being received by at least three GPS antennas in the ATT DSP module, and comparing the phase of at least three satellite signals to a reference signal. In the ATT DSP module (148 of FIG. 2) the step of comparing the phase of two different satellite signals to the reference signal should be done at two time periods that are sufficiently proximate to each other so that the variable oscillator (NCO) frequency does not significantly drift from the phase lock state. Therefore, this comparison results in a value that is proportional to a differential range between the GPS antennas and the tracked GPS satellite.

FIG. 4 depicts a flow chart (200) of the detailed steps of a method of attitude determination using the system (60 of FIG. 2).

After selecting a Master antenna in the PVT Master module (step 202) and acquiring satellite signals using all twelve channels in the PVT master block (step 204), the system (60 of FIG. 2) performs the tracking of the received satellite signals in the PVT Master block (step 206) by continuously adjusting carrier numerically controlled oscillator (NCO) and code numerically controlled oscillator (NCO) and thus continuously closing code and carrier tracking loops in the PVT DSP module (120 of FIG. 2).

After the tracking is accomplished, the PVT Master Block performs the measurements os pseudo range, carrier phase, and other data (step 208). The position, velocity, and time solutions are computed (step 210), and the number of satellites that are being tracked by the PVT block is reduced to six, and the rest six satellites are reassigned to the ATT block (step 212). The six ATT channels are slaved to the six PVT channels so that the ATT block tracks the same six satellites as the PVT Master block (step 214). The Master antenna and the three Slave antennas are being multiplexed in the ATT block (step 216). The carrier phase of each of the six satellites received by the Master antenna and by the three Slave antennas are measured sequentially (step 218). For each tracked satellite the relative carrier phase measurements between the Master and the three Slave antennas are performed by differencing their carrier phases. Finally, the attitude solutions are computed using the relative carrier phase measurements (step 222).

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A measurement system comprising:
    a plurality of Satellite Positioning System (SATPS) antenna modules, each said antenna configured to receive at least one satellite signal emanating from a SATPS satellite system;
    at least two hardware modules, each said hardware module being connected to each said SATPS antenna, each said hardware module configured to process each said received satellite signal and configured to generate a preliminary data; and
    a single navigational processor connected to each said hardware module, said navigation processor configured to process said preliminary data generated by each said hardware module and configured to output a positional data, a velocity data, a time coordinate data, and an attitude data for said measurement system.

2. The measurement system of claim 1, wherein said plurality of SATPS antenna modules further comprises:
    at least three Global Positioning System (GPS) antenna modules configured to receive at least one GPS satellite signal.

3. The measurement system of claim 1, wherein said plurality of SATPS antenna modules further comprises:
    at least three combined GPS/Global Orbiting Navigational System (GLONASS) antenna modules configured to receive at least one GPS satellite signal and at least one GLONASS satellite signal.

4. The system of claim 2;
    wherein said at least three GPS antennas further comprise:
        four GPS antenna modules; each said GPS antenna module further comprising:
            an antenna/preamplifier;
            a bandpass filter; and
            an amplifier;
    and wherein said at least two hardware modules further comprise:
        a position, velocity and time (PVT) hardware module; and
        an attitude (ATT) hardware module, wherein said PVT module and said ATT module are connected;
    and wherein said navigational processor further comprises:
        a PVT microprocessor; and
        an ATT microprocessor;
    and wherein said PVT microprocessor is connected to said PVT hardware module and is configured to compute said PVT data for said measurement system;
    and wherein said ATT microprocessor is connected to said ATT hardware module and is configured to compute said ATT data for said measurement system;
    and wherein said PVT module and said ATT module exchange said PVT data and said ATT data.

5. The system of claim 2;
    wherein said at least three GPS antenna modules further comprise:
        four GPS antenna modules; each said GPS antenna module further comprising:
            an antenna/preamplifier;
            a bandpass filter; and
            an amplifier;
    and wherein said at least two hardware modules further comprise:
        a PVT Master hardware module; and
        an ATT Slave hardware module; wherein said PVT Master module and said ATT Slave module are connected;
    and wherein said navigational processor further comprises:

a PVT microprocessor; and an ATT microprocessor;

and wherein said PVT microprocessor is connected to said PVT Master hardware module and is configured to compute said PVT data for said measurement system;

and wherein said ATT microprocessor is connected to said PVT microprocessor and utilizes said PVT data to compute said ATT data for said measurement system.

6. The system of claim 5, wherein said PVT Master hardware module further comprises:

a single frequency GPS PVT Master hardware module further comprising:

a PVT multiplexer connected to a Master GPS antenna, said Master GPS antenna being selected from said four GPS antennas;

a PVT radio frequency (RF) downconverter connected to said PVT multiplexer, said PVT RF downconverter configured to convert each said received single frequency GPS satellite signal down from said single GPS frequency to an intermediate frequency IF;

a PVT A/D converter connected to said PVT RF downconverter, said PVT A/D converter configured to convert each said IF satellite signal into a digital IF satellite signal; and a PVT digital signal processor (DSP) connected to said PVT A/D converter, said PVT digital signal processor (DSP) further comprising:

a plurality of K sub-DSP/PVT, wherein said integer number K is equal to a number of GPS satellites that can be simultaneously/sequentially and continuously tracked by said PVT Master hardware module, each said sub-DSP/PVT configured to sample each said input GPS Single frequency satellite signal, each said sub-DSP/PVT configured to continuously perform code phase adjustments in a PVT code tracking loop, each said sub-DSP/PVT configured to continuously perform carrier phase adjustments in a PVT carrier tracking loop, said code phase adjustments and said frequency adjustments being performed in order to compensate for the continuous Doppler shift of each said received satellite signal.

7. The system of claim 6, wherein said PVT digital signal processor (DSP) further comprises:

six sub-DSP/PVT; each said sub-DSP/PVT further comprising:

at least two correlators configured to implement at least one satellite channel;

at least three additional correlators configured to assist in first satellite signal acquisition and configured to assist in channel management; and an automatic gain controller (AGC) module.

8. The system of claim 5, wherein said ATT Slave hardware module further comprises:

a GPS Single frequency ATT Slave hardware module further comprising:

an attitude (ATT) multiplexer continuously switching between each said GPS antenna, wherein said ATT module stays connected to each said GPS antenna equal amount of time;

an ATT radio frequency (RF) downconverter connected to said ATT multiplexer, said ATT RF downconverter configured to convert each said received single frequency GPS satellite signal down from said single GPS frequency to said intermediate frequency IF;

an attitude (ATT) A/D converter connected to said ATT RF downconverter, said ATT A/D converter configured to convert each said IF satellite signal into a digital IF satellite signal; and an attitude (ATT) digital signal processor (DSP) connected to said ATT A/D converter, said ATT DSP further comprising:

a plurality of N sub-DSP/ATT, wherein said integer number N is equal to a number of GPS satellites that can be simultaneously/sequentially and continuously tracked by said PVT Master hardware module, each said sub-DSP/ATT being connected to one said sub-DSP/PVT in order to receive the code phase and frequency adjustment data.

9. The system of claim 8, wherein said ATT DSP comprises:

six sub-DSP/ATT; each said sub-DSP/ATT further comprising:

at least two correlators configured to implement at least one satellite channel; and at least three additional correlators configured to assist in first satellite signal acquisition and configured to assist in channel management.

10. A method of attitude determination comprising the steps of:

selecting a Master antenna;

locking on a satellite signal utilizing said Master antenna;

tracking said received satellite signal by continuously adjusting a carrier numerically controlled oscillator (NCO) and a code numerically controlled oscillator (NCO) thus continuously closing a code and a carrier tracking loops in a PVT DSP module;

performing PVT measurements utilizing a PVT channel; and performing attitude measurements utilizing a PVT channel and an ATT channel.

11. The method of claim 10, wherein said step of tracking said received satellite signal further comprising the step of:

continuously adjusting a carrier NCO and a code NCO in a ATT DSP module by continuously receiving code and carrier phase adjustments from said PVT DSP module.

12. The method of claim 10, wherein said step of tracking said received satellite signal further comprising the step of:

continuously adjusting a carrier NCO and a code NCO in a ATT DSP module by sequentially receiving code and carrier phase adjustments from said PVT DSP module.

13. The method of claim 10, wherein said step of performing attitude measurements utilizing said PVT channel and said ATT channel further comprises the steps of:

continuously time multiplexing satellite signals having independent phase relationships and being received by at least three GPS Slave antennas in said ATT DSP module; and comparing the phase of at least three received satellite signals to a continuously supplied reference signal.

14. A method of attitude determination comprising the steps of:

selecting a Master antenna for a PVT Master block comprising twelve channels;

acquiring satellite signals using said twelve channels in said PVT Master block;

tracking said received satellite signals by continuously adjusting a carrier numerically controlled oscillator (NCO) and a code numerically controlled oscillator (NCO) thus continuously closing a code and a carrier tracking loops in a PVT DSP module of said PVT Master block;

performing PVT measurements of pseudo range, carrier phase, and other data utilizing said PVT Master block;

computing the position, velocity, and time solutions utilizing said PVT Master block;

reducing to six the number of satellites that are being tracked by the PVT block;

reassigning the rest six satellite channels to an ATT block;

slaving the six ATT channels to the six PVT channels so that said ATT block tracks the same six satellites as said PVT Master block;

multiplexing said Master antenna and a plurality of Slave antennas in said ATT block;

measuring sequentially the carrier phase of each said satellite being received by said Master antenna and by each said Slave antennas;

performing relative carrier phase measurements between said Master and each said Slave antenna by differencing the carrier phases of each said tracked satellite signal received by said Master and by each said Slave antenna; and computing the attitude solutions using said relative carrier phase measurements.

* * * * *